United States Patent [19]

Fuller et al.

[11] Patent Number: 5,017,644
[45] Date of Patent: May 21, 1991

[54] INK JET INK COMPOSITIONS

[75] Inventors: Timothy J. Fuller, West Henrietta, N.Y.; Warren E. Solodar, Merion, Pa.; Henry R. Kang, Fairport, N.Y.; Samuel Kaplan, Walworth, N.Y.; Raymond K. Crandall, Pittsford, N.Y.

[73] Assignee: Xerox Corporation, Stamford, Conn.

[21] Appl. No.: 354,970

[22] Filed: May 22, 1989

[51] Int. Cl.$^5$ .................... C09D 11/02; C09D 11/10; C08L 79/00
[52] U.S. Cl. .................... 524/612; 524/190; 523/160; 564/453; 260/DIG. 38; 106/20; 106/22; 106/23
[58] Field of Search .................... 106/22, 20, 23; 260/DIG. 38; 524/612, 190; 564/453; 523/160

[56] References Cited

U.S. PATENT DOCUMENTS

| | | | |
|---|---|---|---|
| 3,483,141 | 12/1969 | Litt et al. | 544/88 |
| 3,493,568 | 2/1970 | Levy et al. | 544/88 |
| 4,167,393 | 9/1979 | de Roo | 8/7 |
| 4,197,135 | 4/1980 | Bailey et al. | 106/23 |
| 4,267,088 | 5/1981 | Kempf | 523/420 |
| 4,659,382 | 4/1987 | Kang | 106/22 |
| 4,705,567 | 11/1987 | Hair et al. | 106/20 |
| 4,789,400 | 12/1988 | Solodar et al. | 106/22 |

OTHER PUBLICATIONS

Journal of Polymer Science; Part A-1, vol. 6, 1883–1894, 1968, "Polymerization of Cyclic Iminoethers v. 1,3, Oxazolines with Hydroxy-, Acetoxy-, & Carboxymethyl-Alkyl Groups in the 2 position and their Polymers", A. Levy et al.

Primary Examiner—John Kight, III
Assistant Examiner—P. Hampton-Hightower
Attorney, Agent, or Firm—Judith L. Byorick

[57] ABSTRACT

Disclosed is an ink jet ink composition comprising a liquid vehicle such as water or ethanol, a dye, and a linear N-hydroxyl substituted polyethyleneimine polymer. In a preferred embodiment, the linear N-hydroxyl substituted polyethyleneimine polymer is selected from the group consisting of linear poly(N-hydroxyethylethyleneimine), linear poly(N-hydroxypropylethyleneimine), and linear poly(N-hydroxymethylethyleneimine). Also disclosed is a process for generating images with the disclosed inks in ink jet printing processes, including continuous stream ink jet printing processes. Further, a process for preparing the linear N-hydroxyl substituted polyethyleneimine polymers included in the inks of the present invention is also disclosed.

50 Claims, No Drawings

INK JET INK COMPOSITIONS

BACKGROUND OF THE INVENTION

The present invention is directed to ink jet ink compositions. More specifically, the present invention is directed to ink compositions that are primarily suitable for ink jet printing processes and which contain linear N-hydroxyl substituted polyethylene imine polymers. The inks of the present invention are particularly preferred for use in continuous stream ink jet printing systems.

Ink jet printing systems generally are of two types: continuous stream and drop-on-demand. In drop-on-demand systems, a droplet is expelled from an orifice directly to a position on a recording medium in accordance with digital data signals. A droplet is not formed or expelled unless it is to be placed on the recording medium. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again.

Ink jet printers of the continuous stream type employ printheads having one or more orifices or nozzles from which continuous streams of ink droplets are emitted and directed toward a recording medium. The stream is perturbed, causing it to break up into droplets at a fixed distance from the orifice. Printing information is transferred to the droplets of each stream by electrodes that charge the passing droplets, which permits each droplet to be individually charged so that it may be positioned at a distinct location on the recording medium or sent to the gutter for recirculation. As the droplets proceed in flight from the charging electrodes toward the recording medium, they are passed through an electric field which deflects each individually charged droplet in accordance with its charge magnitude to specific pixel locations on the recording medium. The continuous stream ink jet printing process is described, for example, in U.S. Pat. Nos. 4,255,754; 4,698,123 and 4,751,517, the disclosures of each of which are totally incorporated herein by reference.

U.S. Pat. No. 4,789,400, the disclosure of which is totally incorporated herein by reference, discloses a waterfast ink jet composition which comprises a major amount of water, a hydroxypropylated polyethyleneimine with a weight average molecular weight of from about 1,000 to about 10,000, and a dye component, wherein the ink has a viscosity of from about 1 to about 5 centipoise.

Ink jet ink compositions are known, and generally contain water soluble dyes. For example, U.S. Pat. No. 3,846,141 discloses an ink jet ink which comprises an aqueous solution of a water soluble dye and a humectant material formed of a mixture of a lower alkoxy triglycol and at least one other compound selected from the group consisting of a polyethylene glycol, a lower alkyl ether of diethylene glycol, and glycerol. According to the disclosure of this patent, the ink viscosity is subjected to little variation with use as water is lost by evaporation during recirculation of the ink composition through the jet printer. Moreover, apparently the humectant system disclosed in this patent substantially prevents or minimizes tip drying of the printing ink in the jet orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 0.0024 inch, which is energized by magneto restrictive piezo-electric means for the purpose of emitting a continuous stream of uniform droplets of ink at a rate of 33 to 75 kilohertz. This stream of droplets is desirably directed onto the surface of a moving web of, for example paper, and is controlled to form printed characters in response to video signals derived from an electronic character generator and in response to an electrostatic deflection system.

In addition, U.S. Pat. No. 4,279,653 discloses ink jet inks containing water-soluble wetting agents, a water-soluble dye and an oxygen absorber. Similarly, U.S. Pat. No. 4,196,007 describes an ink jet ink containing an aqueous solution of a water-soluble dye and a humectant consisting of at least one water-soluble unsaturated compound. Further, U.S. Pat. No. 4,267,088 discloses coatings particularly useful as marking inks which contain an epichlorohydrin-modified polyethyleneimine and an ethylene oxide modified polyethyleneimine in an aqueous solution. Other patents of interest are U.S. Pat. Nos. 4,101,329; 4,290,072; 4,383,859; 4,235,773; 4,279,814; 4,443,371; 4,286,989; 4,299,630; 3,864,296; 4,238,234; 3,234,025; 4,520,143; 3,920,855; and 4,182,612.

Further, U.S. Pat. No. 4,197,135 discloses ink compositions with improved waterfastness comprising at least one water soluble dye and a polyamine with 7 or more nitrogen atoms per molecule. Specifically, this patent illustrates an ink composition comprising an aqueous solution of at least one water-soluble dye and from about 0.5 percent to about 10 percent by weight of a polyamine having 7 or more nitrogen atoms per molecule, wherein the composition has a pH of 8 or above. In column 1, beginning at line 61, the patent states that the preferred polyamines have the hydrogen of the primary amine group replaced with either a methyl or a hydroxyethyl group. Examples of fully substituted polyamines are outlined in column 2, beginning at line 40, of the '135 patent.

Additionally, U.S. Pat. No. 4,659,382, the disclosure of which is totally incorporated herein by reference, illustrates an ink composition with improved waterfastness useful for jet printing processes which comprises a major amount of water, a hydroxyethylated polyethyleneimine polymer, and a dye composition, wherein the polymer has incorporated therein from about 65 percent to about 80 percent of hydroxyethyl groups. A specific preferred ink composition illustrated in the aforementioned patent comprises from about 70 percent by weight to about 90 percent by weight of water, from about 1 percent by weight to about 10 percent by weight of a dye molecule, from about 2 percent by weight to about 6 percent by weight of a hydroxyethylated polyethyleneimine having incorporated therein from about 65 percent to about 80 percent of hydroxyl substituents, and additive components.

Further, U.S. Pat. No. 4,705,567 discloses heterophase ink compositions which comprise water and a dye covalently attached to a component selected from the group consisting of poly(ethylene glycols) and poly(ethylene imines), which component is complexed with a heteropolyanion. In addition, U.S. Pat. No. 4,267,088 discloses a solvent resistant ink and coating comprising an aqueous solution of epichlorhydrin-modified polyethyleneimine and an ethylene oxide-modified polyethyleneimine. The modified polyethyleneimines are ethoxylated water-soluble polymers formed by the reaction of relatively high molecular weight polyethyleneimines with ethylene oxide. Also, U.S. Pat. No. 4,167,393 discloses a method for binding a water-soluble direct dye to paper by including in the dye a binder such as polyethyleneimine. The polyethyleneimine is generally produced by the polymerization of ethyleneimine in the presence of an acid catalyst, corresponding propyleneimines, and the like. According to the teachings of this reference, branched polyethyleneimines are most preferred, as stated at column 3, lines 31 and 32.

While the above compositions may be suitable for their intended purposes, there continues to be a need for improved ink jet ink compositions. There also continues to be a need for inks that exhibit waterfastness and that are suitable for use in continuous stream ink jet printing processes. In addition, there is a need for economically attractive ink jet inks with acceptable toxicological properties that also enable waterfast prints. Further, there is a need for ink jet inks that enable waterfast prints and that do not result in clogging of the jets. Additionally, there is a need for ink jet inks that contain N-hydroxyl-substituted polyethyleneimines that are compatible with the dyes that are frequently selected for ink jet inks. A need also exists for ink jet inks with low viscosity. There is also a need for ink jet inks with rapid drying times. Additionally, there is a need for ink jet inks that enable generation of high quality images. Further, there is a need for ink jet inks for which the hues remain stable upon drying, so that when images of one color are formed and dried, they will retain their hue when rewetted with a layer of ink of another color during processes such as full color printing. A need also exists for ink jet inks that do not form precipitates with aging.

SUMMARY OF THE INVENTION

It is an object of the present invention to provide improved ink jet ink compositions.

It is another object of the present invention to provide inks that exhibit waterfastness and that are suitable for use in continuous stream ink jet printing processes.

It is still another object of the present invention to provide economically attractive ink jet inks.

It is yet another object of the present invention to provide ink jet inks with acceptable toxicological properties.

Another object of the present invention is to provide ink jet inks that enable waterfast prints and that do not result in clogging of the jets.

Still another object of the present invention is to provide ink jet inks that contain N-hydroxyl-substituted polyethyleneimines that are compatible with the dyes that are frequently selected for ink jet inks.

Yet another object of the present invention is to provide ink jet inks with low viscosity.

Another object of the present invention resides in the provision of ink jet inks with rapid drying times.

Yet another object of the present invention resides in the provision of ink jet inks that enable generation of high quality images.

Still another object of the present invention resides in the provision of ink jet inks for which the hues remain stable upon drying, so that when images of one color are formed and dried, they will retain their hue when rewetted with a layer of ink of another color during processes such as full color printing.

It is another object of the present invention to provide ink jet inks that do not form precipitates with aging.

These and other objects of the present invention are achieved by providing an ink jet ink composition comprising a liquid vehicle, a dye, and a linear N-hydroxyl substituted polyethyleneimine. In one preferred embodiment of the invention, the linear N-hydroxyl substituted polyethyleneimine is selected from the group consisting of linear poly(N-hydroxyethyl ethyleneimine), linear poly(N-hydroxypropyl ethyleneimine), and linear poly(N-hydroxymethyl ethyleneimine).

The inks of the present invention comprise a major amount of a liquid vehicle, such as ethanol or water, and preferably is distilled or deionized water, in an amount of from about 50 to about 95 percent by weight, and preferably from about 80 to about 85 percent by weight, although other amounts may be employed provided that the objectives of the present invention are achieved. One or more dyes are also present in the inks of the present invention in an amount of from about 1 to about 20 percent by weight, and preferably from about 5 to about 10 percent by weight, although other amounts may be employed provided that the objectives of the present invention are achieved. Suitable dyes for the inks of the present invention include Pontamine Black SP Liquid dye, available from Mobay Chemical Company; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; and Yellow Shade 16948, available from Tricon. Particularly preferred are Pontamine Black SP Liquid dye (Mobay), Atlantic Direct Turquoise 10G Liquid dye (Atlantic Industries), and Special Fast Turquoise 8GL Liquid dye (Mobay).

Ink compositions of the present invention also contain a linear N-hydroxyl substituted polyethyleneimine present in an amount of from about 0.5 to about 10 percent by weight, and preferably from about 2 to about 5 percent by weight, although other amounts may be present provided that the objectives of the present invention are achieved. Ink compositions containing polyethyleneimines and N-hydroxyl substituted polyethyleneimines as waterfastness additives are known, but the known compositions contain branched polyethyleneimines whereas the inks of the present invention contain linear polyethyleneimine derivatives. Ink compositions containing linear N-hydroxyl substituted polyethyleneimines exhibit superior waterfastness, lower viscosities for N-hydroxyl substituted polyethyleneimine polymers with comparable molecular weights, faster drying times, and higher image quality with respect to ink compositions containing branched N-hydroxyl substituted polyethyleneimines. In addition, linear N-hydroxyl substituted polyethyleneimines are less likely to form precipitates or sediments in the ink upon aging of the ink.

The linear N-hydroxyl substituted polyethyleneimines suitable for the present invention are of the general formula

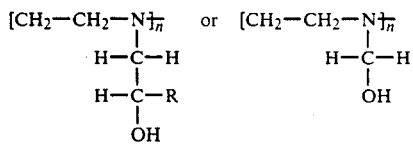

wherein R is either hydrogen or a hydrocarbon group with, for example, from 1 to about 6 carbon atoms, such as methyl, ethyl, propyl, butyl, pentyl, hexyl, or aryl with from 6 to about 24 carbon atoms, such as phenyl, and n is an integer representing the number of segments and being from about 150 to about 700, preferably from about 170 to about 575, and more preferably from about 345 to about 405. The polymers generally have a number average molecular weight of from about 15,000 to about 50,000, and preferably from about 30,000 to about 35,000, as determined by gel permeation chromatography or by light scattering techniques. N-hydroxyl substituted polyethyleneimine polymers with a number average molecular weight of from about 1,000 to about 3,000, wherein n is from about 10 to about 45, are also suitable for the inks of the present invention. Preferably, the polymers are fully substituted, wherein each nitrogen atom is substituted with a hydroxy containing hydrocarbon group and no ether functionalities are present in the polymer. Polymers that are less than fully substituted are also suitable; the advantages of the present invention, however, are increased with an increased degree of substitution in that fully substituted materials exhibit superior dye compatibility, drying times, and image fix with respect to lesser substituted materials.

Additives may be incorporated into the ink compositions of the present invention including biocides in an amount of from about 0.05 to about 1.5 percent by weight, and preferably in an amount of about 0.1 percent by weight, such as Dowcil-75; chelating agents in an amount of from about 0.1 percent by weight to about 0.5 percent by weight, and preferably in an amount of from about 0.2 percent by weight to about 0.4 percent by weight, such as tetrasodium EDTA, commercially available; a buffer solution present in an amount of from about 5 percent to about 35 percent, and preferably in an amount of 5 to 10 weight percent, such as a mixture of 0.1 Molar aqueous solution of sodium hydroxide, typically in an amount of about 10 parts by volume of the buffer, and 0.05 Molar aqueous solution of sodium bicarbonate, typically in an amount of about 33 parts by volume of the buffer; a humectant such as glycerol in an amount of from about 1 percent to about 15 weight percent, and preferably in an amount of from about 5 percent to about 10 weight percent; benzyl alcohol, typically in an amount of about 2 percent by weight, and N-methylpyrrolidone, typically in an amount of about 4 percent by weight. The pH of the ink is adjusted by the addition of concentrated ammonium hydroxide during the ink preparation process.

An example of a typical ink composition of the present invention comprises about 9 percent by weight of a dye, about 0.1 percent by weight of a biocide, about 0.2 percent by weight of tetrasodium ethylenediamine tetraacetate, about 5 percent by weight of a sodium hydroxide/sodium bicarbonate buffer, about 2 percent by weight of benzyl alcohol, about 4 percent by weight of N-methylpyrrolidone, about 3 percent by weight of a linear N-hydroxyl substituted polyethyleneimine, and the remainder water.

Specific properties associated with many of the ink compositions of the present invention include a pH of from about 7 to about 10, preferably from about 8.6 to about 9.0, a surface tension of from about 40 to about 50 dynes/cm, a viscosity from about 1 to about 3 centipoise at 25° C., a waterfastness of from about 70 to over 80 percent, solution stability light fastness of from about 75 to about 95 percent, and desirable optical densities on paper of from about 1 to about 1.4. Other ink characteristics include a specific gravity of from about 1.04 to about 1.05, a conductivity of from about 0.0075 to about 0.009 mho/cm, particle counts of from about 75 to about 160 counts per cubic centimeter, showthrough of about 0.1, and K factors of about 3 (10 microliter drop).

Moreover, the ink compositions of the present invention are very useful in ink jet printing systems. The ink jet nozzles directing the ink remain essentially open and unclogged with inks of the present invention, which is not the situation with many prior art inks. In addition, the ink compositions of the present invention can effectively penetrate the spaces between the fibers contained on the paper substrate, allowing a desirable matte finish, and also permit superior drop formation, primarily because of their low viscosity.

A further embodiment of the present invention comprises adding to the ink composition spreading substances in an amount of from about 1 percent by weight to about 10 percent by weight, and preferably from about 1 percent by weight to about 5 percent by weight. Examples of the aforementioned substances are benzyl alcohol, N-butyldiethanolamine, 2-(2-butoxyethoxy)- ethanol, and 1-methyl-2-pyrrolidinone. Specifically, the purpose of these substances is to increase the spot size on the paper, for example. Thus, a solid image usually requires about 35 percent overlap between ink spots. In some situations, inks with polyethyleneimines contained therein may decrease the ink drop spread on the paper, therefore, these inks may have very small spot sizes. Accordingly, the aforementioned spreading agents are incorporated therein.

N-hydroxyl substituted polyethyleneimines generally can be prepared by hydroxyalkylation of polyethyleneimine with the appropriate alkylene oxide. For example, poly(N-hydroxyethylethyleneimine) can be prepared by the hydroxyethylation of polyethyleneimine with ethylene oxide in a solvent, such as water or ethanol. Linear polyethyleneimine starting material yields a linear N-hydroxyl substituted polyethyleneimine, and branched polyethyleneimine starting material yields a branched N-hydroxyl substituted polyethyleneimine. The general reaction scheme for preparing linear N-hydroxyl substituted polyethyleneimines of the present invention is as follows:

lithium aluminum hydride, and the like. In hydrochloric acid, the hydrolysis generally continues for from about 16 to about 24 hours at temperatures of from about 90° to about 150° C.

Substitution of the polyethyleneimine to form the linear N-hydroxyl substituted polyethyleneimines of the present invention is then carried out by reacting the linear polyethyleneimine with formaldehyde or with the appropriate alkyl oxide, preferably in a one-to-one ratio, although this ratio may vary from about 0.8 to about 1.1, to form the desired product. The polyethyleneimine and the oxide are heated together in a solvent such as water, an alcohol such as ethanol, chloroform, an ether, tetrahydrofuran, and the like, preferably ethanol or water, at a pH of from about 10 to about 12 to temperatures of from about 25° to about 60° C. for from about 1 to about 3 hours, followed by evaporation of the solvent and dialysis in water. Alternatively, the polyethyleneimine may be dissolved in a dilute acid solution, such as hydrochloric acid, subsequently treated with sodium hydroxide to precipitate the polymer from solution, and then reacted with the appropriate oxide, fol-

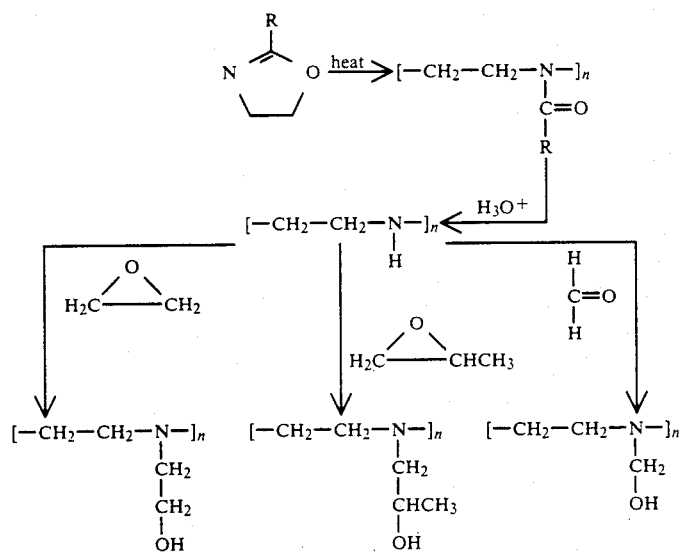

As shown, a polymerization reaction is first effected with 2-oxazoline or a 2-substituted-2-oxazoline, such as 2-ethyl-2-oxazoline, 2-phenyl-2-oxazoline, 2-methyl-2-oxazoline, or 2-oxazoline, by heating to a temperature of from about 90° to about 120° C. for from about 1 to about 16 hours in the presence of a catalyst to form a linear polyoxazoline or poly(2-substituted-2-oxazoline) such as poly (2-ethyl-2-oxazoline), poly (2-phenyl-2-oxazoline), poly (2-methyl-2-oxazoline), or polyoxazoline, wherein n is an integer of from about 170 to about 575, and preferably from about 345 to about 405. R may be hydrogen, aliphatic hydrocarbon groups with from 1 to about 10 carbons, such as methyl or ethyl, aromatic groups with from 6 to about 24 carbon atoms, such as phenyl, and the like. Suitable catalysts include 2-phenyl-2-oxazoline, 2-phenyl-2-oxazolium perchlorate, various Lewis acids, para-toluene sulfonyl chloride, and the like. The formed polyoxazoline is then subjected to a hydrolysis reaction to form the linear polyethyleneimine by heating it in water in the presence of an acid, such as hydrochloric acid, sulfuric acid, and the like. Other deacylation methods may be used to form the linear polyethyleneimine, including hydrolysis with tetrabutylammonium hydroxide, sodium/ammonia, lowed by stirring the mixture for from about 16 to about 24 hours at room temperature. Subsequently, the mixture is heated at temperatures of from about 25° to about 60° C. for from about 1 to about 3 hours, followed by filtration and purification of the filtrate by dialysis. As shown, reacting linear polyethyleneimine with ethylene oxide yields linear poly (N-hydroxyethylethyleneimine). Reacting linear polyethyleneimine with propylene oxide yields linear poly(N-hydroxypropylethyleneimine). Similarly, reacting linear polyethyleneimine with formaldehyde yields linear poly(N-hydroxymethylethyleneimine). The reaction with formaldehyde requires no heating, and proceeds at room temperature. Polymers thus formed generally have a number average molecular weight of from about 15,000 to about 50,000, and preferably from about 30,000 to about 35,000, as determined by gel permeation chromatography or by light scattering techniques.

When the starting material is 2-oxazoline, that is, when R is H, however, the resulting polymer is such that n is generally an integer of from about 10 to about 45, resulting in a linear polymer with a number average molecular weight of from about 1,000 to about 3,000, preferably about 2,000. Ink jet inks of the present invention containing this low molecular weight polymer are particularly suitable for thermal ink jet processes.

Some N-hydroxyl substituted polyethyleneimines are also commercially available, such as branched poly(N-hydroxyethylethyleneimine), available from Chugai Inter Corp., Japan and from Morton-Thiokol, Inc. Further, branched poly(N-hydroxypropylethyleneimine) is commercially available from Morton-Thiokol, Inc. Linear poly(N-hydroxyethylethyleneimine) is commercially available from Polysciences, Inc. Polyethyloxazoline, a reactant from which can be prepared the linear polymers of the present invention, is available at number average molecular weights of 50,000, 200,000, and 500,000 from Dow Chemical Company.

Additional information concerning the polymerization of 2-oxazolines is disclosed in the following references, the disclosures of each of which are totally incorporated herein by reference: T. Kagiya and T. Matsuda, *J. Makromol. Sci.*, A5(8), 1205 (1971); R. Tanaka, I. Ueoka, Y. Takaki, K. Kataoka and S. Saito, *Macromolecules*, 16, 849 (1983); S. Penczek, P. Kubisa and K. Matyjaszewski, *Advances in Polymer Science*, "Cationic Ring-Opening Polymerization" 68/69, 194–197 and 209–225 (1985); K. M. Kem, *J. Polym. Sci, Polym. Chem. Ed.*, 17, 1977 (1979); T. Saegusa, H. Ikeda and H. Fujii, *Polym. J.*, 3, 35 (1972); T. Saegusa, H. Ikeda and H. Fujii, *Macromolecules*, 6(3), 315 (1973); D. A. Tomalia and D. P. Sheetz, *J. Polym. Sci.*, A-1, 4, 2253 (1966); M. J. Han, J. Y. Chang, and Y. Y. Lee, *Macromolecules*, 15, 255 (1982); T. G. Bassiri, A. Levy and M. Litt, *Polym. Lett.*, 5, 871 (1967); A. Levy and M. Litt, *J. Polym. Sci.*, Part A-1, 6, 1883 (1968); J. Bartulin, B. L. Rivas and M. Rodriguez-Baez, *Makromol. Chem.* 183, 2935 (1982); M. H. Litt, A. J. Levy and T. G. Bassiri, U.S. Pat. No. 3,483,141 (1964); S. Kobayashi, T. Tokuzawa and T. Saegusa, *Makromolecules*, 15, 707 (1982); H. Witte and W. Seelinger, *Annalen*, 996 (1974); and M. Litt, A. Levy, and J. Herz, *J. Makromol. Sci., Chem.* A-9 (5) 703 (1975).

The following examples are being supplied to further define various species of the present invention, it being noted that these examples are intended to be illustrative only and are not intended to limit the scope of the present invention. Parts and percentages are by weight unless otherwise indicated.

PREPARATION OF LINEAR POLYETHYLENEIMINE

Example I

Linear polyethyleneimine with a number average molecular weight of about 30,000 as determined by gel permeation chromatography was prepared as follows. Ethanolamine (304 grams) was added over a period of 90 minutes to a stirred suspension of 16.5 grams of cadmium acetate dihydrate in 512 grams of benzonitrile at 130° C. After 16 hours, distillation of the mixture yielded a clear fraction of 2-phenyl-2-oxazoline boiling at 82° C. and at a pressure of 1.5 millimeters of mercury. Subsequently, 2-phenyl-2-oxazolium perchlorate was prepared by adding 19.5 grams of perchloric acid to 20 grams of 2-phenyl-2-oxazoline in 20 milliliters of water and 20 milliliters of ethanol. The resultant solution was cooled to −20° C. to form white crystals of 2-phenyl-2-oxazolium perchlorate, which were isolated by filtration and dried in vacuo at 30° C. Polymerization of 2-phenyl-2-oxazoline was then effected by heating a mixture of 0.52 gram of 2-phenyl-2-oxazolium perchlorate and 100 grams of 2-phenyl-2-oxazoline to 150° C. in an oil bath with stirring under argon. The mixture became too thick to stir within 1 hour. The resulting light yellow solid is poly(2-phenyl-2-oxazoline).

Poly(2-phenyl-2-oxazoline) (70.4 grams) was then heated at reflux for 5 days in a 120° C. silicone oil bath with 710 milliliters of concentrated hydrochloric acid in 540 milliliters of water. The mixture was taken to dryness with a rotary evaporator, and water was subsequently added. Benzoic acid was formed in the mixture as white needles, which were removed by filtration. The filtrate was then made alkaline by the addition of 50 weight percent aqueous sodium hydroxide. Polyethyleneimine was precipitated and collected by filtration, and was washed with water until neutral and dissolved in 300 milliliters of hot ethanol. Polyethyleneimine precipitated upon cooling of the solution to 25° C., and was isolated by filtration and dried in vacuo.

Example II

Linear polyethyleneimine with a number average molecular weight of about 15,000 was prepared as follows. 2-Phenyl-2-oxazolium perchlorate was prepared by adding 19.5 grams of perchloric acid to 20 grams of 2-phenyl-2-oxazoline (number average molecular weight about 35,000 as determined by gel permeation chromatography) in 20 milliliters of water and 20 milliliters of ethanol. The resultant solution was cooled to −20° C. to form white crystals of 2-phenyl-2-oxazolium perchlorate, which were isolated by filtration and dried in vacuo at 30° C. Subsequently, 2-ethyl-2-oxazoline was polymerized by heating 163 grams of 2ethyl-2-oxazoline and 1.22 grams of 2-phenyl-2-oxazolium perchlorate in a crimped aluminum can at 95° C. in an oil bath. Polymerization occurred vigorously within 1.5 hour. The resultant light yellow solid, poly (2-ethyl-2-oxazoline), was peeled from the can and pulverized with a Waring blender.

Poly(2-ethyl-2-oxazoline) (96 grams) in 111 milliliters of concentrated hydrochloric acid and 889 milliliters of water was then heated at 150° C. in an oil bath. Propionic acid distillate was removed with a Claisen-take-off-head until only a solid yellow residue remained. Another 222 milliliters of water and 28 milliliters of concentrated hydrochloric acid were added, and distillation was continued until dryness. The resulting residue was dissolved in water and treated at 25° C. with 50 weight percent aqueous sodium hydroxide until the solution had a pH of 14. Polyethyleneimine that precipitated was isolated by filtration and washed until the pH of the aqueous suspension was between 7 and 8. The white polymer was then filtered and dried to yield linear polyethyleneimine with no detectable $^{13}$C NMR carbonyl resonance.

PREPARATION OF BRANCHED POLY(2-HYDROXYETHYLETHYLENEIMINE)

Example III

Branched polyethyleneimine with a number average molecular weight of about 50,000 (151 grams as a 50 weight percent solution in water), available from Aldrich, was taken to dryness with a rotary evaporator. Ethylene oxide (84 grams) was added to a solution of 67 grams of the polymeric residue in 200 milliliters of ethanol at 25° C. The mixture was enclosed in a Parr pressure reactor and heated at 60° C. for 3 hours. Subsequently, the pressure was dropped from about 200 psi to nearly atmospheric pressure, and the reactor was allowed to cool to 25° C., after which stirring was continued for an additional 16 hours. The reactor was then vented and the contents were concentrated and solvent-exchanged with water. After purification by hollow fiber dialysis using Spectropor membrane tubing (6000-8000 $M_w$ cut-off), the dark yellow polymer solution was concentrated with a rotary evaporator to 30 weight percent solids to yield branched poly(2-hydroxyethylethyleneimine). The product exhibited a $^{13}C$ NMR spectrum with 8 peaks in the range of $\delta=53$ to 75 ppm, indicating the presence of several kinds of methylene carbon atoms, which corresponds to the presence of a branched polymer. The peaks corresponded to those of a $^{13}C$ NMR spectrum taken of branched poly(2-hydroxyethylethyleneimine) commercially available from Morton-Thiokol Inc. and from Chugai Inter Corp., Japan.

Example IV

Branched polyethyleneimine with a number average molecular weight of about 50,000 (80 grams as a 50 weight percent solution in water), available from Aldrich, was diluted with 100 milliliters of water and treated with 52.31 grams of ethylene oxide. The solution was heated in a Parr pressure reactor at 60° C. for 3 hours. Subsequently, the pressure was dropped from about 200 psi to nearly atmospheric pressure, and the reactor was allowed to cool to 25° C., after which stirring was continued for an additional 16 hours. The mixture was then concentrated with a rotary evaporator and purified by dialysis. A $^{13}C$ NMR spectrum of the resulting material corresponded to a $^{13}C$ NMR spectrum of branched poly(2-hydroxyethylethyleneimine) commercially available from Morton-Thiokol Inc. and from Chugai Inter Corp., Japan.

Example V

Ethylene oxide (3.07 grams) was added to 3 grams of branched polyethyleneimine, available from Polysciences, in 100 milliliters of water in a capped Aldrich sure seal bottle. Magnetic stirring of the solution was effected for 24 hours, and the resulting solution was purified by dialysis and then concentrated with a rotary evaporator. A $^{13}C$ NMR spectrum of the product identified it as branched poly(2-hydroxyethylethyleneimine) and indicated that the reaction had gone to completion with minimal polyglycol side reactions.

PREPARATION OF LINEAR POLY(2-HYDROXYETHYLETHYLENEIMINE)

Example VI

Linear polyethyleneimine with a number average molecular weight of about 15,000 (14.22 grams) prepared according to the method of Example II and 14.5 grams of ethylene oxide in 75 grams of ethanol were heated at 60° C. in a Parr reaction vessel for 3 hours. The resulting solution was concentrated with a rotary evaporator and was then dialyzed in water. A $^{13}C$ NMR spectrum of this material exhibited large peaks in the region of $\delta=53$ to 62 ppm, which correspond to the 3 peaks of a $^{13}C$ NMR spectrum of linear poly(N-hydroxyethylethyleneimine) commercially available from Polysciences, Inc., as well as four additional small peaks in the range of 55 to 75 ppm, indicating the presence of small amounts of ether formation due to polyglycol side chains which form pendant to the polyethyleneimine backbone.

Example VII

The procedures of Example VI were repeated with the exception that 9.95 grams of ethylene oxide were used. A $^{13}C$ NMR spectrum of this material indicated that more than half of the available polyethyleneimine backbone nitrogen sites on each macromolecule had reacted to form hydroxyethyl groups with no polyether glycol formation.

Example VIII

The procedures of Example VI were repeated with the exception that 34.6 grams of ethylene oxide were used. A $^{13}C$ NMR spectrum of this material indicated the formation of polyhydroxyethyleneimine with appreciable polyether-glycol formation as indicated by four $^{13}C$ resonances between 61.5 and 72.5 ppm. The results of Examples VI, VII, and VIII indicate that the purest polyhydroxyethyleneimine was formed with the least amount of polyether-glycol side groups when the molar ratio of linear polyethyleneimine to ethylene oxide approaches 1.

Example IX

Linear polyethyleneimine with a number average molecular weight of about 15,000 (10 grams) prepared according to the method of Example II was dissolved in 1 liter of dilute hydrochloric acid and treated dropwise with 50 weight percent aqueous sodium hydroxide until the polymer precipitated at a solution pH of about 8.5. Ethylene oxide (10.2 grams) was then added and the mixture was stirred for 16 hours at 25° C., after which the resulting heterogeneous mixture was heated at 60° C. for 1 hour and filtered. The filtrate was purified by dialysis and then concentrated to yield a light yellow solution of linear poly(N-hydroxyethylethyleneimine) that exhibited a $^{13}C$ NMR spectrum with large peaks in the region of $\delta=53$ to 62 ppm, which correspond to the 3 peaks of a $^{13}C$ NMR spectrum of linear poly(N-hydroxyethylethyleneimine) commercially available from Polysciences, Inc., as well as four additional small peaks in the range of 61.5 to 75 ppm, indicating the presence of small amounts of polyether-glycol side chain substituents which formed pendant to the polyethyleneimine backbone.

PREPARATION OF LINEAR POLY(N-HYDROXYALKYLETHYLENEIMINES)

Example X

Linear polyethyleneimine with a number average molecular weight of about 15,000 (10 grams) prepared according to the method of Example II was dissolved in 100 milliliters of ethanol and treated with 67.28 grams of propylene oxide. The resulting suspension was enclosed in a Parr pressure vessel and heated for 3 hours at 60° C., during which time the pressure rose to 100 psi and then dropped rapidly to less than 20 psi. After cooling, the residue was dried with a rotary evaporator and 150 milliliters of water was added. The material was purified by dialysis, after which the sample was concentrated to 36 percent solids with a rotary evaporator. A $^{13}C$ NMR spectrum of the product indicated that propylene oxide added mostly to the polyethyleneimine to form hydroxypropyl side groups with the methyl group and hydroxy group on the same carbon. There was very little or no polyether-glycol formation under these reaction conditions.

Example XI

Linear polyethyleneimine prepared according to the method of Example II (3 grams) was dissolved in 100 milliliters of water and was treated with 5.66 milliliters of an aqueous solution containing 37 percent by weight of formaldehyde. The resultant solution was allowed to stand for 3 months, after which no sedimentation or precipitation had formed, indicating stability of the solution. The odor of formaldehyde diminished during this time, indicating that the formaldehyde had reacted with the linear polyethyleneimine to form poly(N-hydroxymethylethyleneimine).

PREPARATION OF LOW MOLECULAR WEIGHT LINEAR POLY(2-HYDROXYETHYLETHYLENEIMINE)

Example XII

Linear polyethyleneimine with a number average molecular weight of about 2,000 is prepared according to the method disclosed in T. Saegusa, H. Ikeda and H. Fujii, *Polymer J.* 3, 35 (1972) and T. Saegusa, H. Ikeda and H. Fujii, *Macromolecules* 6(3), 315 (1973), the disclosures of each of which are totally incorporated herein by reference. When treated with ethylene oxide according to the method of Example VI, a low molecular weight linear poly(2-hydroxyethylethyleneimine) material (calculated number average molecular weight about 1,700) is formed. This material is believed to be suitable for incorporation into the inks of the present invention.

PREPARATION OF INK COMPOSITIONS

Example XIII

A cyan ink jet ink composition was prepared by mixing together 5 percent by weight of linear poly(2-hydroxyethylethyleneimine) with a number average molecular weight of about 15,000 prepared according to the method of Example VI, 6 percent by weight of Atlantic Direct Turquoise 10 G Liquid dye (purified form, ammonium salt), 5 percent by weight of a buffer comprising 33 parts by volume of 0.05 Molar sodium bicarbonate and 10 parts by volume of 0.1 Molar sodium hydroxide, 0.1 percent by weight of Dowicil 75 biocide, 0.2 percent by weight of tetrasodium ethylenediamine tetraacetate, 2.5 percent by weight of benzyl alcohol, and 81.2 percent by weight of super quality water. The ink ingredients were mixed over a period of about 2 hours at room temperature under ambient conditions, during which time the pH of the ink was adjusted by addition of concentrated ammonium hydroxide to the mixture. Subsequent to mixing, the ink was filtered through 5 micron and 0.22 micron filters to remove large particles. The resulting ink exhibited a surface tension of 48 dynes per centimeter at 25° C., a viscosity of 1.95 centipoise at 25° C., a pH of 9.42, a specific gravity of 1.045, a conductivity of 0.0090 mhos per centimeter, and a particle count of 140 counts per milliliter of ink. Prints were made with this ink by incorporating it into an ink jet printing apparatus and generating images onto paper. The prints exhibited an optical density of 1.32, a showthrough of 0.10 (optical density measured on the back of the printed paper), an average waterfastness of 80 percent as determined by immersing a strip of the printed paper in distilled water for 5 minutes and determining the ratio of the optical density after immersion to the optical density before immersion. The prints also exhibited a lightfastness of 94 percent as determined by placing the prints in a Weather-O-Meter instrument, which simulates high intensity light radiation, for about 2 hours, and determining the ratio of the optical density after exposure to the optical density before exposure.

An ink prepared for comparison purposes with the same composition but with branched poly(2-hydroxyethylethyleneimine) (available from Morton Thiokol) substituted for linear poly(2-hydroxyethylethyleneimine) exhibited an average waterfastness of 73 percent and a lightfastness of less than 50 percent.

Example XIV

A black ink jet ink composition was prepared by mixing 7.6 percent by weight of Pontamine Black SP Liquid dye, 0.1 percent by weight of Dowicil 75 biocide, 0.2 percent by weight of tetrasodium ethylenediamine tetraacetate, 5 percent by weight of a buffer comprising 33 parts by volume of 0.05 Molar sodium bicarbonate and 10 parts by volume of 0.1 Molar sodium hydroxide, 2 percent by weight of benzyl alcohol, 4.0 percent by weight of linear polyhydroxyethylethyleneimine with a number average molecular weight of about 50,000, available from Polysciences, and 81.1 percent by weight of water. During the mixing of the ingredients, the pH of the ink was adjusted by addition of concentrated ammonium hydroxide to the mixture. The resulting ink exhibited a surface tension of 47.7 dynes per centimeter at 25° C., a viscosity of 2.03 centipoise at 25° C., a pH of 9.1, a specific gravity of 1.040, a conductivity of 0.0064 mhos per centimeter, and a particle count of 157 counts per milliliter of ink. Prints were made with this ink by incorporating it into an ink jet printing apparatus and generating images onto paper. The prints exhibited an optical density of 1.15, a showthrough of 0.09, an average waterfastness of 81 percent, and a lightfastness of 72 percent.

An ink prepared for comparison purposes with the same composition but with branched poly(2-hydroxyethylethyleneimine) (available from Morton Thiokol) substituted for linear poly(2-hydroxyethylethyleneimine) exhibited an average waterfastness of about 73 percent and a lightfastness of less than 50 percent.

Other modifications of the invention may occur to those skilled in the art subsequent to a review of the present application; these modifications, as well as equivalents thereof, are intended to be included within the scope of the present invention.

What is claimed is:

1. An ink jet ink composition comprising a liquid vehicle, a dye, and a linear N-hydroxyl substituted polyethyleneimine polymer.

2. An ink jet ink composition according to claim 1 wherein the liquid vehicle is selected from the group consisting of water, ethanol, and mixtures thereof.

3. An ink jet ink composition according to claim 1 wherein the linear N-hydroxyl substituted polyethyleneimine polymer is selected from the group consisting of linear poly(N-hydroxyethylethyleneimine), linear poly(N-hydroxypropylethyleneimine), and linear poly(N-hydroxymethylethyleneimine).

4. An ink jet ink composition according to claim 1 wherein the linear N-hydroxyl substituted polyethyleneimine polymer is present in an amount of from about 0.5 to about 10 percent by weight.

5. An ink jet ink composition according to claim 1 wherein the linear N-hydroxyl substituted polyethyleneimine polymer is present in an amount of from about 2 to about 5 percent by weight.

6. An ink jet ink composition according to claim 1 wherein the ink contains a material selected from the group consisting of benzyl alcohol, N-methylpyrrolidone, and mixtures thereof.

7. A process for generating images which comprises incorporating into an ink jet printing apparatus the ink composition of claim 1 and forming images by causing the ink to be expelled in droplets onto a substrate, thereby generating an image on the substrate.

8. A process according to claim 7 wherein the ink contains a linear N-hydroxyl substituted polyethyleneimine polymer selected from the group consisting of linear poly(N-hydroxyethylethyleneimine), linear poly(N-hydroxypropylethyleneimine), and linear poly(N-hydroxymethylethyleneimine).

9. A process according to claim 7 wherein the linear N-hydroxyl substituted polyethyleneimine polymer is present in an amount of from about 0.5 to about 10 percent by weight.

10. A process according to claim 7 wherein the image is generated by a continuous stream ink jet printing process.

11. An ink jet ink composition comprising a liquid vehicle, a dye, and a linear N-hydroxyl substituted polyethyleneimine polymer of the formula

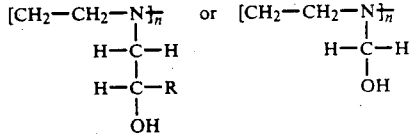

wherein R is selected from the group consisting of hydrogen and aliphatic or aromatic hydrocarbon groups, and n is an integer which represents the number of segments.

12. An ink jet ink composition according to claim 11 wherein R is selected from the group consisting of hydrogen and hydrocarbon groups with from 1 to about 6 carbon atoms.

13. An ink jet ink composition according to claim 11 wherein n is an integer of from about 170 to about 575.

14. An ink jet ink composition according to claim 11 wherein n is an integer of from about 345 to about 405.

15. An ink jet ink composition according to claim 11 wherein the polymer has a number average molecular weight of from about 15,000 to about 45,000.

16. An ink jet ink composition according to claim 11 wherein the polymer has a number average molecular weight of from about 30,000 to about 35,000.

17. An ink jet ink composition according to claim 11 wherein the linear N-hydroxyl substituted polyethyleneimine polymer is selected from the group consisting of linear poly(N-hydroxyethylethyleneimine), linear poly(N-hydroxypropylethyleneimine), and linear poly(N-hydroxymethylethyleneimine).

18. An ink jet ink composition according to claim 11 wherein the linear N-hydroxyl substituted polyethyleneimine polymer is present in an amount of from about 0.5 to about 10 percent by weight.

19. An ink jet ink composition according to claim 11 wherein the liquid vehicle is selected from the group consisting of water, ethanol, and mixtures thereof.

20. A process for generating images which comprises incorporating into an ink jet printing apparatus the ink composition of claim 11 and forming images by causing the ink to be expelled in droplets onto a substrate, thereby generating an image on the substrate.

21. An ink jet ink composition comprising a liquid vehicle, a dye, and a linear N-hydroxyl substituted polyethyleneimine polymer of the formula

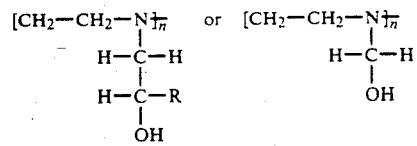

wherein R is selected from the group consisting of hydrogen and aliphatic or aromatic hydrocarbon groups, and n is an integer of from about 10 to about 45.

22. An ink jet ink composition according to claim 21 wherein the polymer has a number average molecular weight of from about 1,000 to about 3,000.

23. An ink jet ink composition according to claim 21 wherein the polymer has a number average molecular weight of about 2,000.

24. An ink jet ink composition according to claim 21 wherein the liquid vehicle is selected from the group consisting of water, ethanol, and mixtures thereof.

25. A process for generating images which comprises incorporating into an ink jet printing apparatus the ink composition of claim 21 and forming images by causing the ink to be expelled in droplets onto a substrate, thereby generating an image on the substrate.

26. A process according to claim 25 wherein the image is generated by a thermal ink jet printing process.

27. A process for preparing linear N-hydroxyl substituted polyethyleneimine polymers which comprises (a) heating an oxazoline selected from the group consisting of 2-oxazoline and 2-substituted-2-oxazolines in the presence of a catalyst to form a linear polyoxazoline; (b) subsequently subjecting the poly (2-oxazoline) or polyoxazoline to a hydrolysis reaction by heating it in water in the presence of an acid to form linear polyethyleneimine; and (c) heating the linear polyethyleneimine and an alkyl oxide in a solvent to form the linear N-hydroxyl substituted polyethyleneimine polymer.

28. A process for preparing linear N-hydroxyl substituted polyethyleneimine polymers which comprises (a) heating an oxazoline selected from the group consisting of 2-oxazoline and 2-substituted-2-oxazolines in the presence of a catalyst to form a linear polyoxazoline; (b) subsequently subjecting the polyoxazoline to a hydrolysis reaction by heating it in water in the presence of an acid to form linear polyethyleneimine; (c) dissolving the polyethyleneimine in a dilute acid solution; (d) adding sodium hydroxide to the reaction mixture to precipitate the polyethyleneimine from solution; (e) adding an alkylene oxide to the reaction mixture and stirring at room temperature; and (f) heating the reaction mixture to form the linear N-hydroxyl substituted polyethyleneimine polymer.

29. A process according to claim 27 wherein the 2-substituted-2-oxazoline is selected from the group consisting of 2-methyloxazoline, 2-ethyloxazoline, and 2-phenyloxazoline.

30. A process according to claim 28 wherein the 2-substituted-2-oxazoline is selected from the group consisting of 2-methyloxazoline, 2-ethyloxazoline, and 2-phenyloxazoline.

31. A process according to claim 27 wherein the linear polyoxazoline is formed by heating the oxazoline to a temperature of from about 90° to about 120° C.

32. A process according to claim 28 wherein the linear polyoxazoline is formed by heating the oxazoline to a temperature of from about 90° to about 120° C.

33. A process according to claim 27 wherein the linear polyethyleneimine is formed by heating the linear polyoxazoline to a temperature of from about 90° to about 150° C.

34. A process according to claim 28 wherein the linear polyethyleneimine is formed by heating the linear polyoxazoline to a temperature of from about 90° to about 150° C.

35. A process according to claim 27 wherein the linear N-hydroxyl substituted polyethyleneimine polymer is formed by reacting the linear polyethyleneimine and the alkyl oxide in an approximately one to one ratio.

36. A process according to claim 28 wherein the linear N-hydroxyl substituted polyethyleneimine polymer is formed by reacting the linear polyethyleneimine and the alkyl oxide in an approximately one to one ratio.

37. A process according to claim 27 wherein the alkyl oxide is selected from the group consisting of ethylene oxide and propylene oxide.

38. A process according to claim 28 wherein the alkyl oxide is selected from the group consisting of ethylene oxide and propylene oxide.

39. A process according to claim 27 wherein the linear N-hydroxyl substituted polyethyleneimine polymer is formed by heating the linear polyethyleneimine and the alkyl oxide to a temperature of from about 25° to about 60° C.

40. A process according to claim 39 wherein the linear polyethyleneimine and the alkyl oxide are first stirred together at room temperature and then heated to temperatures of from about 25° to about 60° C.

41. A process for preparing linear N-hydroxyl substituted polyethyleneimine polymers which comprises (a) heating an oxazoline selected from the group consisting of 2-oxazoline and 2-substituted-2-oxazolines in the presence of a catalyst to form a linear polyoxazoline; (b) subsequently subjecting the polyoxazoline to a hydrolysis reaction by heating it in water in the presence of an acid to form linear polyethyleneimine; (c) dissolving the polyethyleneimine in a dilute acid solution; (d) adding sodium hydroxide to the reaction mixture to precipitate the polyethyleneimine from solution; (e) adding formaldehyde to the reaction mixture and stirring at room temperature.

42. A process according to claim 41 wherein the 2-substituted oxazoline is selected from the group consisting of 2-methyloxazoline, 2-ethyloxazoline, and 2-phenyloxazoline.

43. A process according to claim 41 wherein the linear polyoxazoline is formed by heating the oxazoline to a temperature of from about 90° to about 120° C.

44. A process according to claim 41 wherein the linear polyethyleneimine is formed by heating the linear polyoxazoline to a temperature of from about 90° to about 150° C.

45. A process according to claim 44 wherein the acid is selected from the group consisting of sulfuric acid and hydrochloric acid.

46. A process according to claim 41 wherein the linear N-hydroxyl substituted polyethyleneimine polymer is formed by reacting the linear polyethyleneimine and the formaldehyde in an approximately one to one ratio.

47. An ink jet ink composition according to claim 21 wherein R is selected from the group consisting of hydrogen and hydrocarbon groups with from 1 to about 6 carbon atoms.

48. A process according to claim 27 wherein the oxazoline is 2-oxazoline and the linear N-hydroxyl substituted polyethyleneimine polymer has from about 10 to about 45 repeating segments.

49. A process according to claim 28 wherein the oxazoline is 2-oxazoline and the linear N-hydroxyl substituted polyethyleneimine polymer has from about 10 to about 45 repeating segments.

50. A process according to claim 41 wherein the oxazoline is 2-oxazoline and the linear N-hydroxyl substituted polyethyleneimine polymer has from about 10 to about 45 repeating segments.

* * * * *